US012611946B2

(12) United States Patent
Fiorina et al.

(10) Patent No.: US 12,611,946 B2
(45) Date of Patent: Apr. 28, 2026

(54) SINGLE-PHASE AND THREE-PHASE HYBRID FILTER SYSTEM FOR AN ELECTRIC CHARGER

(71) Applicant: Valeo Siemens eAutomotive France SAS, Cergy (FR)

(72) Inventors: Jean-Noel Fiorina, Sillans (FR); Larbi Bendani, Meru (FR)

(73) Assignee: Valeo Siemens eAutomotive France SAS, Cergy (FR)

( * ) Notice: Subject to any disclaimer, the term of this patent is extended or adjusted under 35 U.S.C. 154(b) by 982 days.

(21) Appl. No.: 17/787,116

(22) PCT Filed: Dec. 14, 2020

(86) PCT No.: PCT/EP2020/085969
§ 371 (c)(1),
(2) Date: Jun. 17, 2022

(87) PCT Pub. No.: WO2021/122452
PCT Pub. Date: Jun. 24, 2021

(65) Prior Publication Data
US 2023/0029870 A1 Feb. 2, 2023

(30) Foreign Application Priority Data

Dec. 20, 2019 (FR) ...................................... 1915354

(51) Int. Cl.
B60L 53/20 (2019.01)
B60L 53/30 (2019.01)
(Continued)

(52) U.S. Cl.
CPC .............. B60L 53/20 (2019.02); B60L 53/30 (2019.02); H02J 3/32 (2013.01); H02M 1/10 (2013.01);
(Continued)

(58) Field of Classification Search
CPC .... B60L 2270/147; B60L 53/30; B60L 53/20; H02M 1/123; H02M 1/10
See application file for complete search history.

(56) References Cited

U.S. PATENT DOCUMENTS

| | | | | |
|---|---|---|---|---|
| 2014/0268933 A1* | 9/2014 | Zhou | ....................... | H02M 1/12 |
| | | | | 363/44 |
| 2016/0121740 A1* | 5/2016 | Zaki | ........................ | B60L 53/18 |
| | | | | 320/109 |

FOREIGN PATENT DOCUMENTS

| | | |
|---|---|---|
| CN | 101192791 A | 6/2008 |
| CN | 105896693 A | 8/2016 |

(Continued)

OTHER PUBLICATIONS

International Search Report and Written Opinion issued in corresponding International Patent Application No. PCT/EP2020/085969, mailed on Feb. 9, 2021 (14 pages).

(Continued)

*Primary Examiner* — Julian D Huffman
*Assistant Examiner* — Sadia Kousar
(74) *Attorney, Agent, or Firm* — Osha Bergman Watanabe & Burton LLP

(57) ABSTRACT

The present invention relates to an electrical system comprising at least one magnetic cell connected to an external grid system and comprising a filtering cell having a capacitor X (CDM1, CDM2, CDM3) and a capacitor Y (CY). Said electrical system comprises an array of switches, connected up-circuit of the capacitors X (CDM1, CDM2, CDM3) and Y (CY) of said filtering cell, said array of switches being configured such that:

in a single-phase operating mode, the series-connected switches (S2, S3) on the unpowered phases (B, C) are open, and the switches (S1, S4) connected between the first phase (A) and the other phases (B, C) are closed;

(Continued)

in a multi-phase operating mode, the series-connected switches (S2, S3) are closed and the switches (S1, S4) connected between the first phase (A) and the other phases (B, C) are open.

12 Claims, 2 Drawing Sheets

(51) Int. Cl.
  *H02J 3/32*       (2006.01)
  *H02M 1/10*       (2006.01)
  *H02M 1/12*       (2006.01)

(52) U.S. Cl.
  CPC ....... *H02M 1/123* (2021.05); *B60L 2270/147* (2013.01)

(56) References Cited

FOREIGN PATENT DOCUMENTS

| | | | | |
|---|---|---|---|---|
| CN | 110233514 | A | 9/2019 | |
| EP | 3621174 | A1 | 3/2020 | |
| JP | 2007300700 | A * | 11/2007 | ............ H02M 1/126 |
| KR | 20190024051 | A * | 3/2019 | ........... H03H 1/0007 |

OTHER PUBLICATIONS

Office Action issued in Corresponding JP Application No. 2022-537533; dated Jun. 30, 2023 (7 Pages with English Translation).
Office Action issued in corresponding European Application No. 20820461.0; dated Jan. 27, 2025 (10 pages).
Office Action issued in corresponding Chinese Application No. 2020800941193.3; dated Jan. 26, 2025 (5 pages).

* cited by examiner

SINGLE-PHASE AND THREE-PHASE HYBRID FILTER SYSTEM FOR AN ELECTRIC CHARGER

TECHNICAL FIELD

The present invention relates to the field of electrical systems, particularly electric chargers for vehicles and, more specifically, concerns an electrical system equipped with "hybrid" filtering cells for such chargers, said electrical system being capable of operating in a single-phase charging mode and in a three-phased charging mode.

PRIOR ART

In known multi-phase electrical systems, particularly in electric chargers for electric or hybrid vehicles, the use of dedicated filters for each line is known, in other words, for each phase conductor and for the neutral conductor, for the filtering of differential mode currents and common mode currents.

The term "differential mode current" specifically defines ripple currents corresponding to interference which is transmitted on the phases of a multi-phase electrical system and is looped back via the neutral conductor.

The term "common mode current" specifically defines stray currents associated with the switching of power disconnectors in an electrical system, circulating between the phases and the electrical ground, and between the neutral conductor and the electrical ground of the electrical system concerned.

Differential mode currents and common mode currents correspond to high-frequency disturbances, particularly at frequencies in excess of 100 kHz, affecting currents transmitted by the electrical system.

For the filtering of differential mode currents, capacitors described as capacitors X are employed, connected between each phase and the neutral conductor and, for the filtering of common mode currents, capacitors described as capacitors Y are employed, connected between each line and ground, in other words, in general, the frame of the multi-phase electrical installation concerned.

According to the prior art, single-phase filters are employed for the attenuation of differential mode currents and common mode currents, line by line.

However, this entails various disadvantages which impact negatively upon the effectiveness of filtering, particularly in a single-phase charging mode.

The total capacitance value Y on all lines combined governs the potential intensity of a leakage current flowing in the frame, the leakage current in this case being a low-frequency current, in other words a current at the frequency of the external grid system, generally 50 Hz or 60 Hz. This leakage current induces a "touch current", which corresponds to the current which would flow through the body of a person who touches the frame, in the event of the interruption of the protective conductor.

This touch current is limited, i.e. it must be possible to guarantee that this touch current will never exceed a maximum permissible threshold, for reasons of safety, thereby limiting, in practice, the maximum total capacitance value Y and thus, by definition, limiting the rating of each capacitor Y of the electrical system.

According to the prior art, in consequence, in a multiphase electrical system, a filter comprised of at least one capacitor X and one capacitor Y is present, which is adapted to its "dedicated" line. As indicated above, the total capacitance value Y is limited, for reasons of safety associated with the maximum permissible value of the touch current, such that the capacitance Y of the single-phase filter which is appropriate to a given line is reduced still further, thereby affecting its capacity to attenuate the corresponding common mode current. Accordingly, the greater the number of lines, the less effective each single-phase filter will be, on the grounds that the value of the capacitance Y, distributed over the totality of lines, is respectively reduced on each of these lines.

One solution to this problem, according to the prior art, involves an increase in the magnitude of the inductance of each line. There is a resulting drawback, however, with respect to spatial requirements for an electrical system thus dimensioned.

A further disadvantage associated with the parallel operation, according to the prior art, of one single-phase filter per line stems from the resulting obligation for the observation of a more stringent performance margin for each individual filter, in order to maintain the overall filtering performance required for the electrical system as a whole. In practice, on each line, in single-phase operation, interference is present, which is cumulative. Accordingly, limits for the reinjection of current into the external grid system are the same for operation in single-phase mode and in three-phase mode such that, in single-phase operation, the current reinjected into the external grid system is three times greater than in three-phase operation. In consequence, conventionally, the desirable performance margin for each single-phase filter, in other words for each line, is of the order of 10 dB.

In order to offset the above-mentioned disadvantages, at least in part, the proposed solution involves a hybrid filter structure, which is multi-phase by design, with relays which are configured to permit the setting of the operation of the filter, either for single-phase operation or for three-phase operation (particularly for three-phase operation). Specifically, in other words, in place of an electrical system comprising three single-phase filters operating in parallel, the invention proposes an electrical system with a three-phase filter.

According to the invention, as detailed hereinafter, an array of switches is specifically configured to permit an optimum filtering performance, whether for a single-phase supply or a three-phase supply, particularly for a three-phase supply. Accordingly, the invention is particularly appropriate to an electrical system constituting an on-board electric charger for an electric or hybrid vehicle, said electric charger being capable of operating, and thus of charging a supply battery of said electric or hybrid vehicle, with either a single-phase or a three phase external electric power supply.

Presentation of Invention

More specifically, the object of the invention is an electrical system, which is particularly configured to assume the function of an electric charger arranged between an external grid system and a battery of an electric or hybrid vehicle, said electrical system comprising at least one magnetic cell connected to an external grid system and comprising a magnetic core and a plurality of windings wound about said magnetic core, said plurality of windings constituting at least three lines, including one neutral conductor, the nonneutral lines being described as "phases", a first phase of which is the phase which is supplied where the external grid system which supplies the electrical system is a single-phase network, and all the phases of which are supplied where the external grid system which supplies the electrical system is a multi-phase network, and the neutral conductor being described as "the neutral", the magnetic cell comprising a filtering cell having a capacitor X for the filtering of the differential mode current connected between each phase and the neutral, and a capacitor Y for the filtering of the common mode current connected between each phase and the electrical ground of the electrical system, and between the neutral and said electrical ground, said electrical ground being particularly constituted by a frame of the electrical system. Said electrical system comprises an array of switches, connected up-circuit of the capacitors X and Y of said filtering cell for the differential mode current and the common mode current, said array of switches comprising a series-connected switch on each phase, with the exception of the first phase, and a switch connected between the first phase and each of the other phases, said array of switches being configured such that:

in a single-phase operating mode, where the external grid system which supplies the electrical system is a single-phase network and supplies only the first phase, the series-connected switches on the unpowered phases are open, and the switches connected between the first phase and the other phases are closed;

in a multi-phase operating mode, where the external grid system which supplies the electrical system is a multi-phase network and supplies all the phases, the series-connected switches are closed and the switches connected between the first phase and the other phases are open.

Accordingly, all the phases of the electrical system according to the invention transmit a current output, and all the capacitors X and Y are involved in the filtering of differential mode currents and common mode currents, including in single-phase mode.

In consequence, the total capacitance value Y in single-phase mode is increased, whilst maintaining compliance with standards governing touch current; consequently, the individual rating of the capacitors Y can be reduced.

As the capacitors X are arranged down-circuit of the array of switches, all the capacitors X are involved in the filtering of ripple currents, thus permitting the reduction of any risk of the overheating of the capacitors X.

By means of the invention, it is thus possible to reduce the overall magnitude of inductances.

According to one embodiment, the electrical system according to the invention comprises at least two magnetic cells arranged successively in series, the array of switches being arranged in the last of the magnetic cells, i.e. the magnetic cell which is furthest removed from the external grid system, whilst still up-circuit of the capacitors X and Y of the filtering cells of said last magnetic cell.

According to one embodiment, the differential mode current filtering cell also comprises, on each line, the leakage inductance corresponding to the plurality of windings of the magnetic cell, such that a filter of the LC type for differential mode currents is constituted.

According to one embodiment, the common mode current filtering cell also comprises, on each line, the inductance corresponding to the plurality of windings of the magnetic cell, such that a filter of the LC type for common mode currents is constituted.

According to one embodiment, the array of switches is connected between the plurality of windings of the magnetic cell and the capacitors X of the filtering cell.

In particular, the electrical system comprises a capacitor X, connected at the input of the electrical system between each phase and the neutral, which is configured to reduce the input impedance of the electrical system.

According to one embodiment, the array of switches is comprised of a number of relays which is equal to the number of lines.

According to one embodiment, the electrical system according to the invention comprises exactly three phases, namely, a first phase, a second phase and a third phase, which can be appropriately supplied with electrical energy from an external three-phase grid, such that the electrical system thus comprises three phases, including the first phase, in addition to the neutral, or four conductors in total.

According to one embodiment, the windings of the magnetic cell(s) are configured for the transmission of an electric current of 48 A via the first phase and the neutral, and for the transmission of an electric current of 16 A on the second and third phases.

According to one embodiment, the array of switches comprises a first switch connected between the first phase and the second phase, a second switch connected in series on the second phase, at the input of the magnetic cell or of the magnetic cell which is furthest removed from the input of the electrical system, a third switch connected in series on the third phase, at the input of the magnetic cell or of the magnetic cell which is furthest removed from the input of the electrical system, and a fourth switch connected between the first phase and the third phase, wherein:

in a single-phase operating mode, the first and fourth switches are closed, and the second and third switches are open, and in a three-phase operating mode, the first and fourth switches are open, and the second and third switches are closed.

According to one embodiment, the magnetic cell(s) comprise a magnetic core and four windings, respectively constituting the three phases and the neutral, the winding constituting the first phase, which is designed to receive current from the external grid system in a single-phase operating mode, being arranged in diametral opposition to the winding which constitutes the neutral.

In particular, the electrical system according to the invention constitutes an electric charger for an electric or hybrid vehicle.

PRESENTATION OF FIGURES

Understanding of the invention will be clarified by the consultation of the following description, which is provided by way of an example only, and by reference to the attached drawings, which are provided by way of non-limiting examples, in which identical references are applied to similar elements, and in which.

It should be observed that the figures present the invention in a detailed manner, in order to permit the deployment of the invention, said figures naturally being able to be employed for the more effective definition of the invention, where applicable.

DETAILED DESCRIPTION OF THE INVENTION

Figures 1, 2:
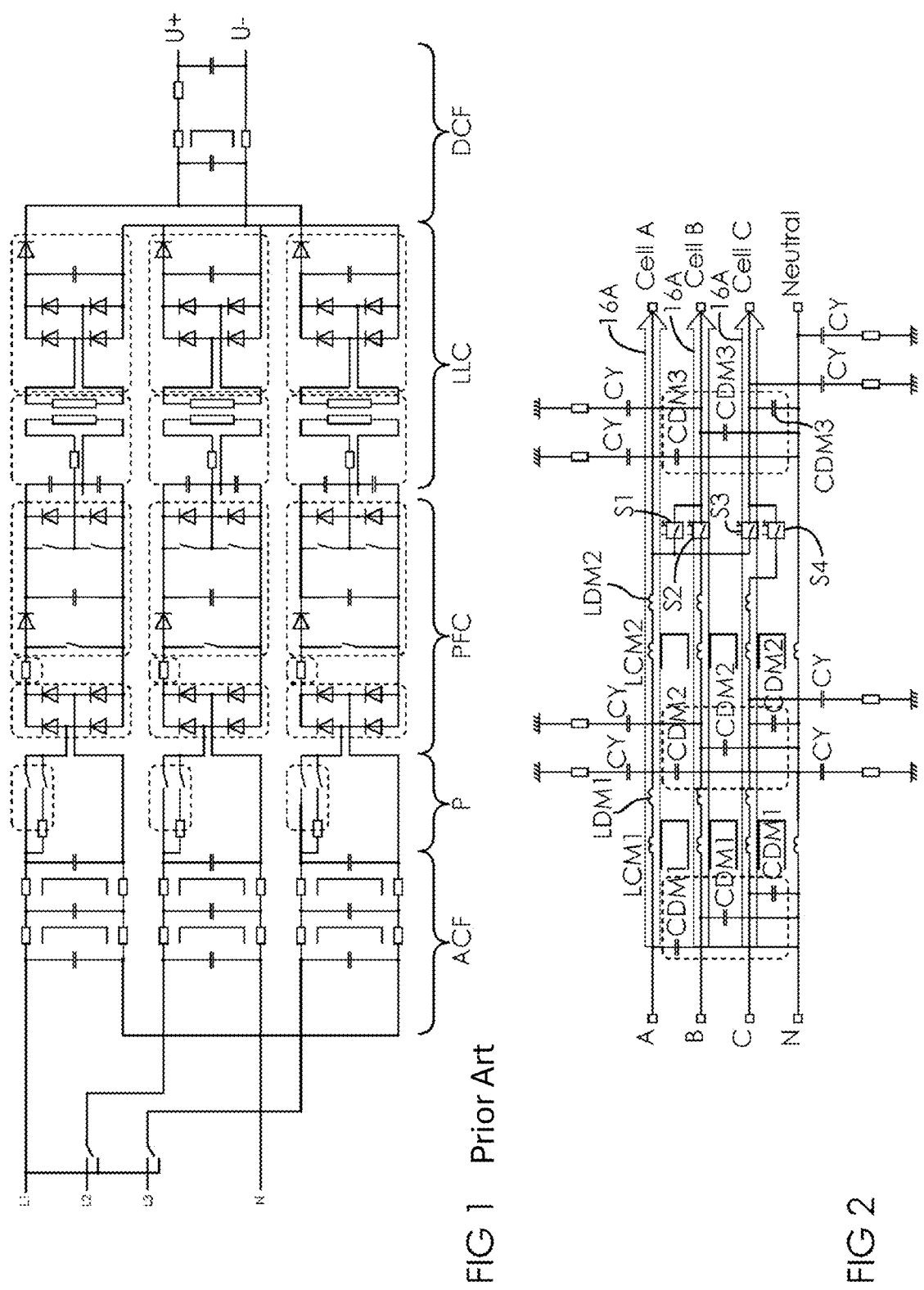
FIG. 1 shows a schematic representation of a three-phase electric charger according to the prior art.
FIG. 2 shows a schematic representation of an exemplary electrical system according to the invention, in a three-phase operating mode.

FIG. 1 shows an electrical system, particularly an electric charger which is capable of operating in a three-phase or a single-phase mode. In other words, the electric charger represented in [FIG. 1] can charge a battery, particularly a battery of an electric or hybrid vehicle, connected at the output terminal U+/U−, using electrical energy supplied by an external single-phase or three-phase grid system.

In single-phase mode, the external electric power supply delivers current on line L1 only. The relays connected at the inputs of lines L2 and L3 are open. In three-phase mode, the three lines L1, L2, L3, in other words, the three phases of the three-phase electric charger represented, are supplied with electrical energy. The electrical system also comprises a neutral conductor N.

Conventionally, each phase L1, L2, L3 comprises a pre-charging circuit P, arranged up-circuit of a converter circuit for the correction of the power factor PFC, comprising three phases in parallel, followed by three DC voltage converter circuits, for example of the LLC type, but not by way of limitation, also connected in parallel.

Filtering elements ACF are connected at the input, for the treatment of alternating currents supplied to each phase L1, L2, L3, and filtering elements DCF are connected at the output of the electric charger, for the treatment of the direct current delivered to the battery.

In a known manner, converter circuits are constituted in the form of windings which are wound about a respective magnetic core, constituting transformers which are controlled by assemblies of semiconductors, particularly switches, such as MOSFETs, which can be connected, for example, to form H-bridges.

Figure 3:
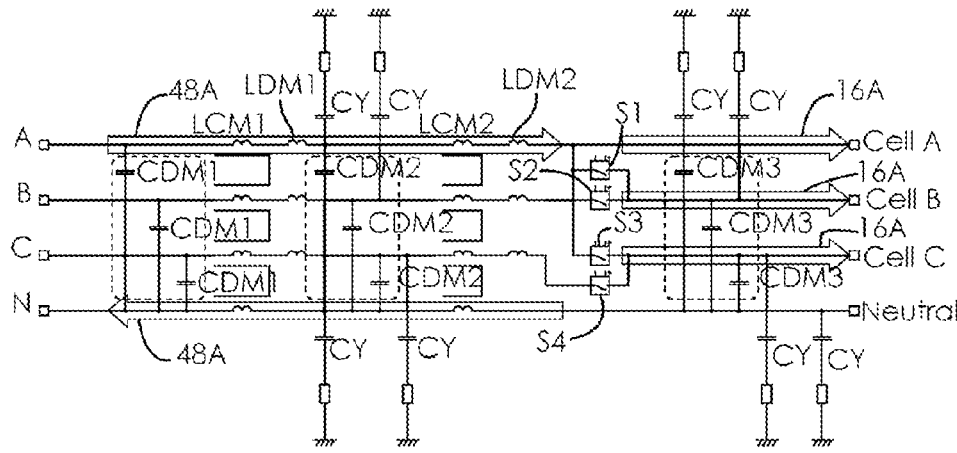
FIG. 3 shows a schematic representation of an exemplary electrical system according to the invention, in a single-phase operating mode.

With reference to FIGS. 2 and 3, a "hybrid" filtering solution is proposed, which functions effectively in a single-phase mode and in a three-phase mode. The capacitors CDM1, CDM2, CDM3 are capacitors X, which are appropriate for participating in the filtering of differential mode currents, and the capacitors CY are capacitors Y, which are appropriate for participating in the filtering of common mode currents.

The capacitors X CDM1, CDM2, CDM3 are connected between each phase A, B, C and the neutral N.

The capacitors Y CY are connected between each phase A, B, C and the electrical ground which, in this case, corresponds to the frame of the electrical system, and between the neutral N and said electrical ground.

First capacitors X CDM1 are connected at the input of the electrical system, and permit the restriction of the input impedance of the electrical system.

The electrical system represented in FIGS. 2 and 3 comprises two magnetic cells, which are structured around a respective magnetic core, about which windings are wound which correspond to the four constituent lines of the system, namely, the three phases A, B, C and the neutral. These three phases A, B, C and this neutral N are connected, at the output of the electrical system, to respective terminals Cell A, Cell B, Cell C and Neutral, to which an external electrical device may be connected, particularly a DC/DC converter for the charging of a battery of an electric or hybrid vehicle.

The function of the magnetic cells is the filtering of common mode and differential mode disturbances.

According to the embodiment represented in FIGS. 2 and 3, an array of switches is provided in the second magnetic cell, and is comprised of four relays S1, S2, S3, S4. The first phase A corresponds to the phase which is supplied with electrical energy in a single-phase mode. The first phase A incorporates no relays of the series-connected array of switches. Conversely, the first phase A is connected to each of the two other phases B, C by means of a respective relay S1, S4. Moreover, each of said two other phases B, C comprises a respective relay S2, S3 connected in series at the input of the resonant converter circuit which is supplied by the corresponding phase B, C.

In the example represented, the electrical system comprises two magnetic cells. However, there may be more magnetic cells connected in series. In all cases, the array of switches is preferably arranged in the final cell, i.e. in the magnetic cell which is furthest removed from the input of the electrical system, and connected to the external grid system. In practice, shielding is preferably provided between successive magnetic cells, in order to prevent any propagation of electrical disturbances up-circuit, particularly toward the external grid system.

The array of switches S1, S2, S3, S4 is arranged, in the filtering cell of the final magnetic cell, up-circuit of the filtering capacitors X and Y, and down-circuit of the magnetic core and the windings. In practice, if the array of switches were to be arranged down-circuit of the capacitors X and Y, there would be a consequent risk of an increase in line interference, or even the generation of high-frequency short-circuits, via couplings between conductive paths, and particularly a risk of the transfer of disturbances originating, for example, from a power converter connected at the output of the electrical system, toward the external grid system.

The array of switches is consequently arranged between the magnetic core of the final magnetic cell, about which the windings are wound, in other words the final "self-induction coil", and the capacitors X and Y of the filtering cell associated with this final magnetic cell.

According to this embodiment, in each filtering cell, i.e. for each phase, the capacitors Y CY constitute, together with the inductance LCM1, LCM2 of the magnetic cell, a circuit of the LC type for the filtering of common mode currents.

On another side, the capacitors X CDM1, CDM2, CDM3 constitute, together with the leakage inductance LDM1, LDM2 of the magnetic cell, a circuit of LC type for the filtering of differential mode currents. Although operation with the leakage inductance of the magnetic cell is preferred, it is possible, alternatively, for specific inductances LDM1, LDM2 to be provided, connected in series on each phase A, B, C.

Accordingly, for a given line, a filtering cell is, in practice, comprised of the self-induction coil, in combination with the capacitors X and the capacitors Y connected to this line.

MODES OF OPERATION

The electrical system according to the invention, particularly as described above in the context of a single-phase and three-phase electric charger, features a single-phase operating mode and a three-phase operating mode. In particular, in the example of an electrical system in the form of single-phase and three-phase electric charger, the electrical system according to the invention features a single-phase operating mode and a three-phase operating mode. By means of its architecture, particularly by means of the array of switches and the judicious positioning thereof, the electrical system according to the invention permits the effective filtering or, in other words, the attenuation of differential leakage currents and common mode currents, with reduced dimensions and spatial requirements, and in compliance with safety requirements.

The three-phase operating mode, in the case of an electric charger, corresponds to a mode in which an external three-phase grid system supplies an electric current to the three phases A, B, C for the charging of a battery, particularly a battery of an electric or hybrid vehicle, further to the conversion of the three-phase electric current by means of the magnetic cells of the electric charger. For example, each phase A, B, C will then conduct a current of approximately 16 A. In a three-phase operating mode, in practice, there is no current in the neutral, as the sum of the three currents flowing in the phases is zero.

According to the invention, in this context, with reference to [FIG. 2], the relays S2, S3 in the array of switches are closed, and are thus conductive, i.e. they conduct electric current or are in the ON state. The other relays S1, S4 are open.

Thus, naturally, the filtering cells of each phase are employed.

The present invention is particularly advantageous in a single-phase operating mode. Here, in the case of an electric charger, a single-phase external grid system delivers an electric current to the first phase A only, again for the charging of a battery, particularly a battery of an electric or hybrid vehicle, further to the conversion of the three-phase electric current by means of the magnetic cells of the electric charger. In this example, in comparison with the three-phase operating mode, the first phase A will then conduct a current of approximately 48 A. In the single-phase operating mode, no electric current is injected from the external grid system into the other phases B, C (separate from the first phase).

According to the invention, in this context, with reference to [FIG. 3], the relays S1, S4 in the array of switches are closed, and are thus conductive, i.e. they conduct electric current or are in the ON state. The other relays S2, S3 are open.

Accordingly, the array of switches is controlled such that electric current is distributed on three output terminals Cell A, Cell B, Cell C of the electrical system, for example for the supply of a power converter for charging a battery of an electric or hybrid vehicle. At the same time, electric current flows through the filtering cells of the three phases A, B, C. Thus, with reference to [FIG. 3], four capacitors Y CY are employed in the final magnetic cell for the attenuation of common mode currents. There is thus a substantial increase in the number of capacitors Y engaged in the filtering of common mode currents in single-phase operation. Consequently, compliance with the touch current, which is a function of the total capacitance value Y of the electrical system, is easier to maintain, with an equivalent filtering performance. In practice, as more capacitors Y are employed, it is possible to select capacitors Y of a lower rating than those employed in the prior art, and to achieve an equal, if not a superior, level of attenuation of common mode currents.

Even in a single-phase operating mode, all the capacitors Y CY are therefore involved in the constitution of the leakage current in the event of the disconnection of the neutral, such that the touch current remains well below the desired threshold, in particular, for example, a threshold of 2.5 mA.

The same applies to the capacitors X. Thus, still with reference to [FIG. 3], two additional capacitors X CDM3 are employed, in comparison with a system according to the prior art, wherein the capacitors X CDM3 connected between phases B, C, which are separate from the first phase A and the neutral N, would not be engaged. Ripple currents can thus be attenuated more easily.

A further advantage of the invention proceeds from the fact that, as indicated above, the self-induction coil, in other words the windings wound about a respective magnetic core to constitute magnetic cells are involved in the execution of filtering by the respective constitution, in combination with the capacitors X and Y, of a LC circuit. The resulting flexibility in the rating of the capacitors X and Y, by means of the invention, also permits a reduction in the size of windings, and thus a reduction of spatial requirements for the electrical system.

Thus, by means of the invention, the array of switches is positioned such that it permits, in single-phase operation, an increase in the number of capacitors X, Y involved, whilst maintaining compliance with the limiting value for touch current, and permits the achievement of a more dimensionally compact electrical system.

For example, still in the context of a single-phase and three-phase electric charger for charging an electric battery of an electric or hybrid vehicle, the present invention permits the selection of a capacitor Y having a rating of 6.2 nF per line, as against 4.1 nF per line according to the prior art, whilst ensuring a touch current of less than 2.5 mA. The inductance of each winding of the magnetic cell may be equal to 5 mH, as against a value equal to or greater than 20 mH according to the prior art.

The positioning of the array of switches in the final magnetic cell, such that the former is removed from the input of the electrical system, permits the prevention of electromagnetic coupling phenomena between the relays S1, S2, S3, S4 and the input terminals of the electrical system.

Figure 4:
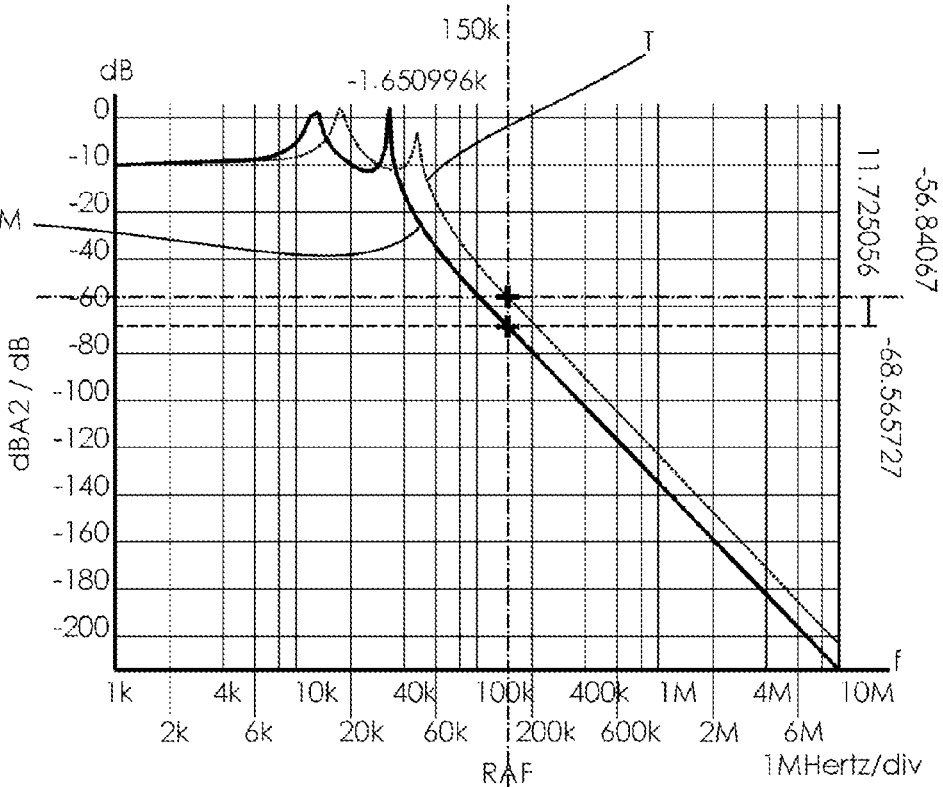
FIG. 4 shows a diagram for filtering performance in an exemplary electrical system according to the invention.

Moreover, with reference to [FIG. 4], the filtering performance, with respect to attenuation, has been represented as a function of the frequency f, in single-phase operation M and in three-phase operation T, with 3.5 kW of electric power transmitted per phase A, B, C in three-phase mode, and 11 kW of electric power transmitted in single-phase mode, further to the injection thereof into the first phase L1. As can be seen, the performance in single-phase mode is improved by approximately 10 dB.

Embodiment of Self-Induction Coil

Regarding the embodiment of magnetic cells, it is specified that, according to a preferred embodiment, in the arrangement of windings about the magnetic core, it is ensured that the winding which is intended to constitute the first phase is as far removed as possible, vis-à-vis the neutral. In other words, in a magnetic core of annular design, the coil winding corresponding to the first phase and that corresponding to the neutral are arranged in opposition to each other; in other words, they are diametrally opposed in relation to the annular structure of the magnetic core. Thus, in a single-phase operating mode, the leakage inductance involved in the execution of filtering is maximized, as explained above, by the constitution of a LC circuit, particularly incorporating the capacitors Y or the capacitors X. By maximizing the leakage inductance in a single-phase operating mode, a direct improvement in filtering performance in this mode of operation is achieved, without impairing filtering performance in a three-phase operating mode.

The invention claimed is:

1. An electrical system configured to assume the function of an electric charger arranged between an external grid system and a battery of an electric or hybrid vehicle, said electrical system comprising:

at least one magnetic cell connected to an external grid system and comprising a magnetic core and a plurality of windings wound about said magnetic core, said plurality of windings forming at least three lines, including one neutral conductor, the non-neutral lines being described as "phases", a first phase of which is the phase which is supplied where the external grid system which supplies the electrical system is a single-phase network, and all the phases of which are supplied where the external grid system which supplies the electrical system is a multi-phase network, and the neutral conductor being described as "the neutral", the magnetic cell comprising:

a filtering cell having a first capacitor for the filtering of the differential mode current connected between each phase and the neutral, and a second capacitor for the filtering of the common mode current connected between each phase, and an electrical ground of the electrical system, and between the neutral and said electrical ground, said electrical ground being constituted by a frame of the electrical system; and an array of switches, connected up-circuit of the first and second capacitors and of said filtering cell for the differential mode current and the common mode current, said array of switches comprising a series-connected switch on each phase, with the exception of the first phase, and a switch connected between the first phase and each of the other phases, said array of switches being configured such that:

in a single-phase operating mode, where the external grid system which supplies the electrical system is a single-phase network and supplies only the first phase, the series-connected switches on the unpowered phases are open, and the switches connected between the first phase and the other phases are closed;

in a multi-phase operating mode, where the external grid system which supplies the electrical system is a multi-phase network and supplies all the phases, the series-connected switches are closed and the switches connected between the first phase and the other phases are open.

2. The electrical system as claimed in claim 1, comprising at least two magnetic cells arranged successively in series, the array of switches being arranged in the last of the magnetic cells which is furthest removed from the external grid system, whilst still up-circuit of the first and second capacitors of the filtering cells of said last magnetic cell.

3. The electrical system as claimed in claim 1, wherein the differential mode current filtering cell also comprises, on each line, a leakage inductance corresponding to the plurality of windings of the magnetic cell, such that a filter of the LC type for differential mode currents is constituted.

4. The electrical system as claimed in claim 1, wherein the common mode current filtering cell also comprises, on each line, a leakage inductance corresponding to the plurality of windings of the magnetic cell, such that a filter of the LC type for common mode currents is constituted.

5. The electrical system as claimed in claim 1, wherein the array of switches is connected between the plurality of windings of the magnetic cell and the capacitors of the filtering cell.

6. The electrical system as claimed in claim 1, comprising the first capacitor connected at the input of the electrical system between each phase and the neutral, which is configured to reduce the input impedance of the electrical system.

7. The electrical system as claimed in claim 1, wherein the array of switches is comprised of a number of relays which is equal to the number of lines.

8. The electrical system as claimed in claim 1, comprising exactly three phases, namely, a first phase, a second phase and a third phase, which can be appropriately supplied with electrical energy from an external three-phase grid, such that the electrical system thus comprises three phases, including the first phase, in addition to the neutral, or four conductors in total.

9. The electrical system as claimed in claim 8, wherein the windings of the magnetic cell(s) are configured for the transmission of an electric current of 48 A via the first phase and the neutral, and for the transmission of an electric current of 16 A on the second and third phases.

10. The electrical system as claimed in claim 8, wherein the array of switches comprises a first switch connected between the first phase and the second phase, a second switch connected in series on the second phase, at the input of the magnetic cell or of the magnetic cell which is furthest removed from the input of the electrical system, a third switch connected in series on the third phase, at the input of the magnetic cell or of the magnetic cell which is furthest removed from the input of the electrical system, and a fourth switch connected between the first phase and the third phase, wherein:

in a single-phase operating mode, the first and fourth switches are closed, and the second and third switches are open, and in a three-phase operating mode, the first and fourth switches are open, and the second and third switches are closed.

11. The electrical system according to claim 8, wherein the magnetic cell(s) comprise a magnetic core and four windings, respectively constituting the three phases and the neutral, the winding constituting the first phase, which is designed to receive current from the external grid system in a single-phase operating mode, being arranged in diametral opposition to the winding which constitutes the neutral.

12. The electrical system as claimed in claim 1, wherein an electric charger is constituted for an electric or hybrid vehicle.

* * * * *